United States Patent
Cao

(10) Patent No.: US 9,384,527 B2
(45) Date of Patent: Jul. 5, 2016

(54) ELECTRONIC DEVICE AND IMAGE DISPLAYING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Dan Cao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 217 days.

(21) Appl. No.: 14/159,397

(22) Filed: Jan. 20, 2014

(65) Prior Publication Data

US 2014/0267385 A1    Sep. 18, 2014

(30) Foreign Application Priority Data

Mar. 12, 2013  (CN) .......................... 2013 1 0077912

(51) Int. Cl.
- *G09G 5/00*    (2006.01)
- *G06T 3/00*    (2006.01)
- *G06T 11/00*   (2006.01)

(52) U.S. Cl.
CPC ............... *G06T 3/0056* (2013.01); *G06T 11/00* (2013.01)

(58) Field of Classification Search
CPC ................................. G06T 11/60; G06T 19/00
USPC .......................................................... 345/619
See application file for complete search history.

(56) References Cited

U.S. PATENT DOCUMENTS

| | | | | |
|---|---|---|---|---|
| 2004/0160462 | A1* | 8/2004 | Sheasby et al. | 345/788 |
| 2005/0195157 | A1* | 9/2005 | Kramer et al. | 345/156 |
| 2008/0143742 | A1* | 6/2008 | Jeong et al. | 345/619 |
| 2008/0235621 | A1* | 9/2008 | Boillot | 715/810 |
| 2013/0024854 | A1* | 1/2013 | Kumagai | 717/174 |
| 2013/0235076 | A1* | 9/2013 | Cherna et al. | 345/625 |
| 2013/0239057 | A1* | 9/2013 | Ubillos et al. | 715/833 |
| 2013/0239063 | A1* | 9/2013 | Ubillos et al. | 715/838 |
| 2014/0064635 | A1* | 3/2014 | Johnson | 382/284 |

* cited by examiner

*Primary Examiner* — Devona Faulk
*Assistant Examiner* — Jin Ge
(74) *Attorney, Agent, or Firm* — ScienBiziP, P.C.

(57) ABSTRACT

In a computerized method for displaying images of an electronic device having a display, operations to an image displayed on the display are detected. Data of the operations to the first image is acquired and recorded in a storage of the electronic device. When the first image is operated to display again, the first image is processed according to the recorded data of the operations to the first image, and the processed first image is then displayed via the display.

14 Claims, 2 Drawing Sheets

ELECTRONIC DEVICE AND IMAGE DISPLAYING METHOD

BACKGROUND

1. Technical Field

Embodiments of the present disclosure relate to a method for displaying images of an electronic device.

2. Description of Related Art

Many electronic devices, such as smart phones and tablet computers, have a camera to capture images. When using the electronic device to view a captured image, the image can be zoomed in and out, and panned to show an area of interest. However, when the image is viewed again, the same operations must be performed on the image a second time, which is inconvenient. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
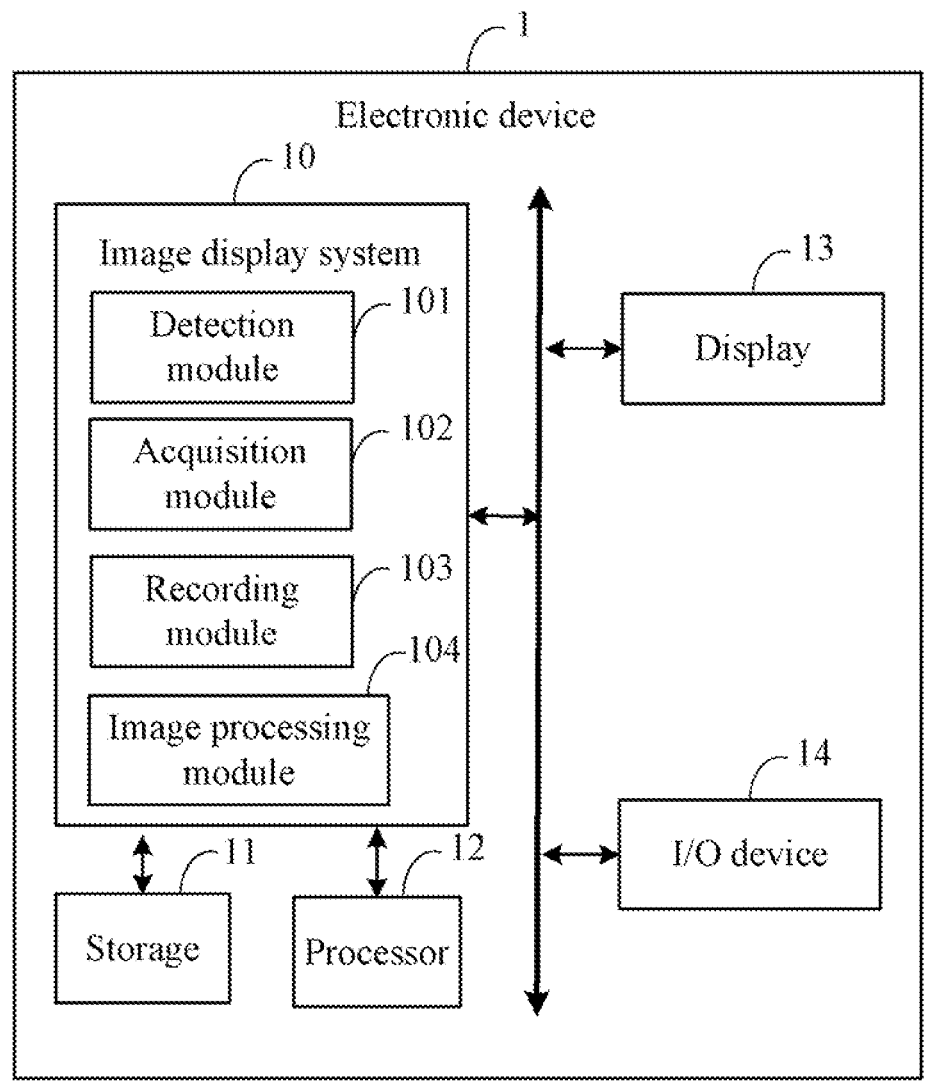
FIG. 1 is a schematic block diagram illustrating one embodiment of an electronic device.

FIG. 1 is a schematic block diagram illustrating one embodiment of an electronic device 1. The electronic device 1 includes an image display system 10, a storage 11, a processor 12, a display 13, and an input/output (I/O) device 14. The electronic device 1 can be a digital camera, a smart phone, a tablet computer, a mobile Internet device (MID), or other similar device having a function of displaying images. FIG. 1 shows one embodiment of the electronic device 1, and can include more or fewer components than those shown in the embodiment, or have a different configuration of the components.

The image display system 10 can include a plurality of programs in the form of one or more computerized instructions stored in the storage 11 and executed by the processor 12 to perform operations of the electronic device 1. In the embodiment, the image display system 10 includes a detection module 101, an acquisition module 102, a recording module 103, and an image processing module 104. The storage 11 can be an external or embedded storage medium of the electronic device 1, such as a secure digital memory (SD) card, a Trans Flash (TF) card, a compact flash (CF) card, or a smart media (SM) card.

In general, the word "module," as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium include CDs, DVDs, BLU-RAY®, flash memory, and hard disk drives.

Figure 2:
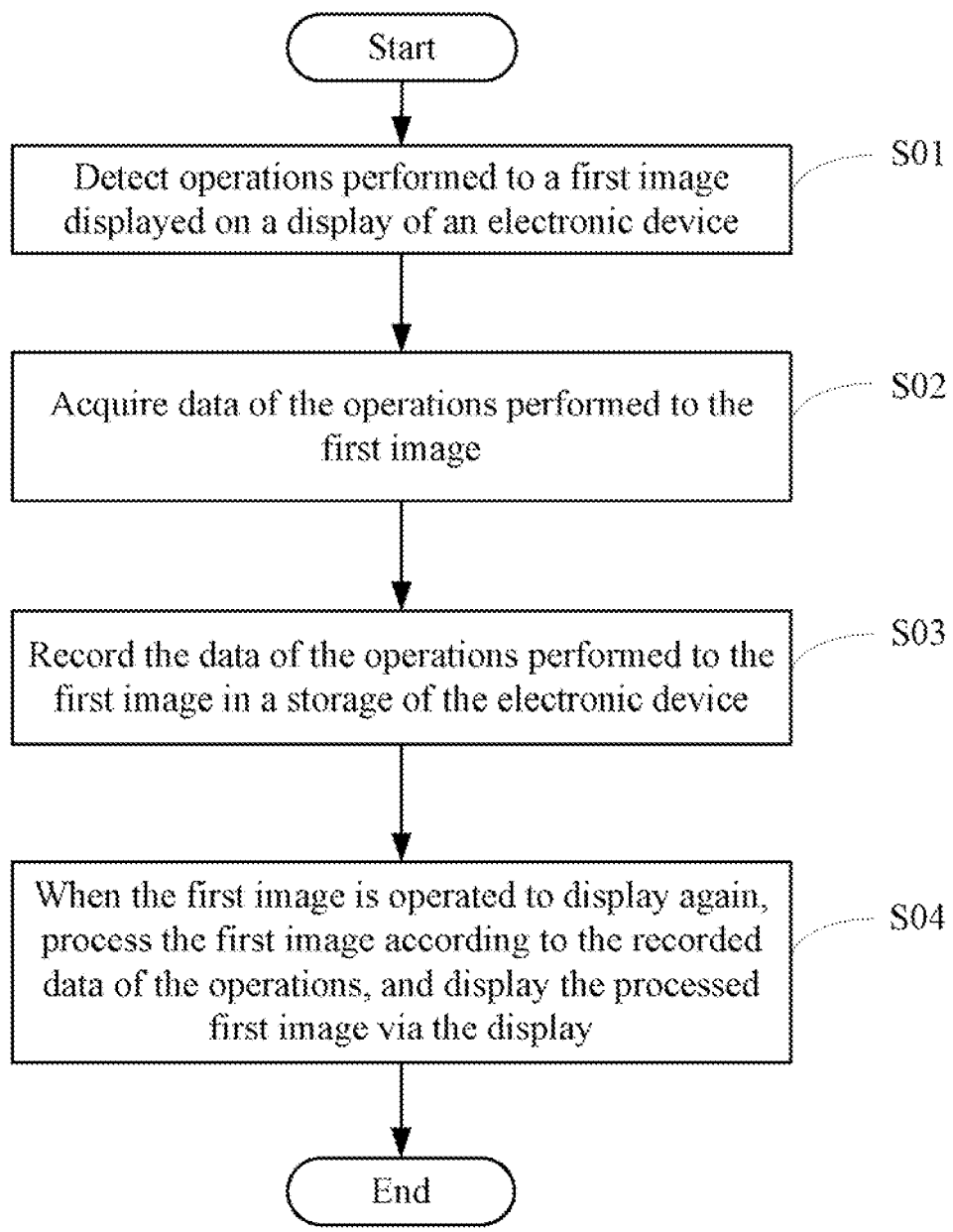
FIG. 2 is a flowchart of one embodiment of a method for displaying images of the electronic device of FIG. 1.

FIG. 2 shows a flowchart of one embodiment of a method for displaying images of the electronic device 1. Depending on the embodiment, additional steps may be added, others removed, and the ordering of the steps may be changed.

In step S01, the detection module 101 detects operations performed to a first image displayed on the display 13 of the electronic device 1. In the embodiment, the operations performed to the first image can include, zooming in, zooming out, rotating, and/or panning of the first image. The detection module 101 can detect the operations performed to the first image using the I/O device 14. In other embodiments, the display 13 can be a touch screen, and the detection module 101 can detects the operations to the first image using the touch screen. The I/O device 14 can be a mouse, a keyboard, and a remote control.

In step S02, the acquisition module 102 acquires data of the operations performed to the first image. The data of the operations performed to the first image can include zooming data, rotation data, and/or panning data of the first image. The zooming data includes a ratio of an original size of the first image to a size of the zoomed first image. The rotation data includes a rotation orientation and a rotation angle of the first image. The panning data includes a panning distance and a panning direction.

In step S03, the recording module 103 records the data of the operations performed to the first image in the storage 11. In the embodiment, if no operation is performed to the first image, no operation data referring to the first image is recorded in the storage 11. If the first image is further operated after the data of the operations to the first image has been recorded in the storage 11, the recorded data is not updated.

In step S04, when the first image is operated to be displayed again, the image processing module 104 processes (e.g., zoom, rotate, or pan) the first image according to the recorded data of the operations performed to the first image, and displays the processed first image via the display 13. In one example, before the first image is displayed via the display 13 again, the image processing module 104 first zooms in or zooms out the first image according to the zooming data, rotates the first image according to the rotation data, and/or pans within the first image according to the panning data.

In other embodiments, when the electronic device switches the current first image to a second image to be displayed on the display 13, the image processing module 104 first determines if there is data of operations performed to the second image recorded in the storage 11. If there is no data of operations performed to the second image recorded in the storage 11, the image processing module 104 can first process the second image according to the recorded data of the operations to the previous first image, and then display the processed second image via the display 13.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method executed by an electronic device having a display and a processor for automatically adjusting the displaying images, the method comprising:

detecting operations performed to a first image displayed on the display;

acquiring data of the operations performed to the first image;

recording the data of the operations performed to the first image in a storage of the electronic device; and in response to the first image being operated to display again, processing the first image according to the recorded data of the operations performed to the first image, and displaying the processed first image via the display;

in response to a second image being operated to display via the display, determining if there is data of operations performed to the second image recorded in the storage;

performing the recorded operations performed to the first image on the second image executed by the processor if there is no data of operations performed to the second image recorded in the storage; and displaying the processed second image via the display.

2. The method according to claim 1, wherein the operations performed to the first image comprise at least one of zooming in, zooming out, rotating, and panning of the first image and the operations performed to the first image are detected using an input/output device of the electronic device.

3. The method according to claim 2, wherein the data of the operations performed to the first image comprises at least one of zooming data, rotation data, and panning data of the first image, the zooming data comprises a ratio of an original size of the first image to a size of the zoomed first image, the rotation data comprises a rotation orientation and a rotation angle of the first image, and the panning data comprises a panning distance and a panning direction of the first image.

4. The method according to claim 3, wherein the step of processing the first image comprises zooming in or zooming out the first image according to the zooming data.

5. The method according to claim 3, wherein the step of processing the first image comprises rotating the first image according to the rotation data.

6. The method according to claim 3, wherein the step of processing the first image comprises panning the first image according to the panning data.

7. The method according to claim 1, wherein the display is a touch screen.

8. An electronic device, comprising:
a display;
a storage;
a processor; and
one or more programs executed by the processor to perform a method for displaying images of the electronic device, the method comprising:

detecting operations performed to a first image displayed on the display;

acquiring data of the operations performed to the first image;

recording the data of the operations performed to the first image in the storage of the electronic device; and in response to the first image being operated to display again, processing the first image according to the recorded data of the operations performed to the first image, and displaying the processed first image via the display;

in response to a second image being operated to display via the display, determining if there is data of operations performed to the second image recorded in the storage;

performing the recorded operations performed to the first image on the second image executed by the processor if there is no data of operations performed to the second image recorded in the storage; and displaying the processed second image via the display.

9. The electronic device according to claim 8, wherein the operations performed to the first image comprise at least one of zooming in, zooming out, rotating, and panning of the first image and the operations performed to the first image are detected using an input/output device of the electronic device.

10. The electronic device according to claim 9, wherein the data of the operations performed to the first image comprises at least one of zooming data, rotation data, and panning data of the first image, the zooming data comprises a ratio of an original size of the first image to a size of the zoomed first image, the rotation data comprises a rotation orientation and a rotation angle of the first image, and the panning data comprises a panning distance and a panning direction of the first image.

11. The electronic device according to claim 10, wherein the step of processing the first image comprises zooming in or zooming out the first image according to the zooming data.

12. The electronic device according to claim 10, wherein the step of processing the first image comprises rotating the first image according to the rotation data.

13. The electronic device according to claim 10, wherein the step of processing the first image comprises panning the first image according to the panning data.

14. The electronic device according to claim 8, wherein the display is a touch screen.

* * * * *